No. 714,081. Patented Nov. 18, 1902.
O. WIDMANN.
APPARATUS FOR TRANSMITTING THE POSITIONS OF MOVABLE POINTERS.
(Application filed Feb. 12, 1902.)
(No Model.)
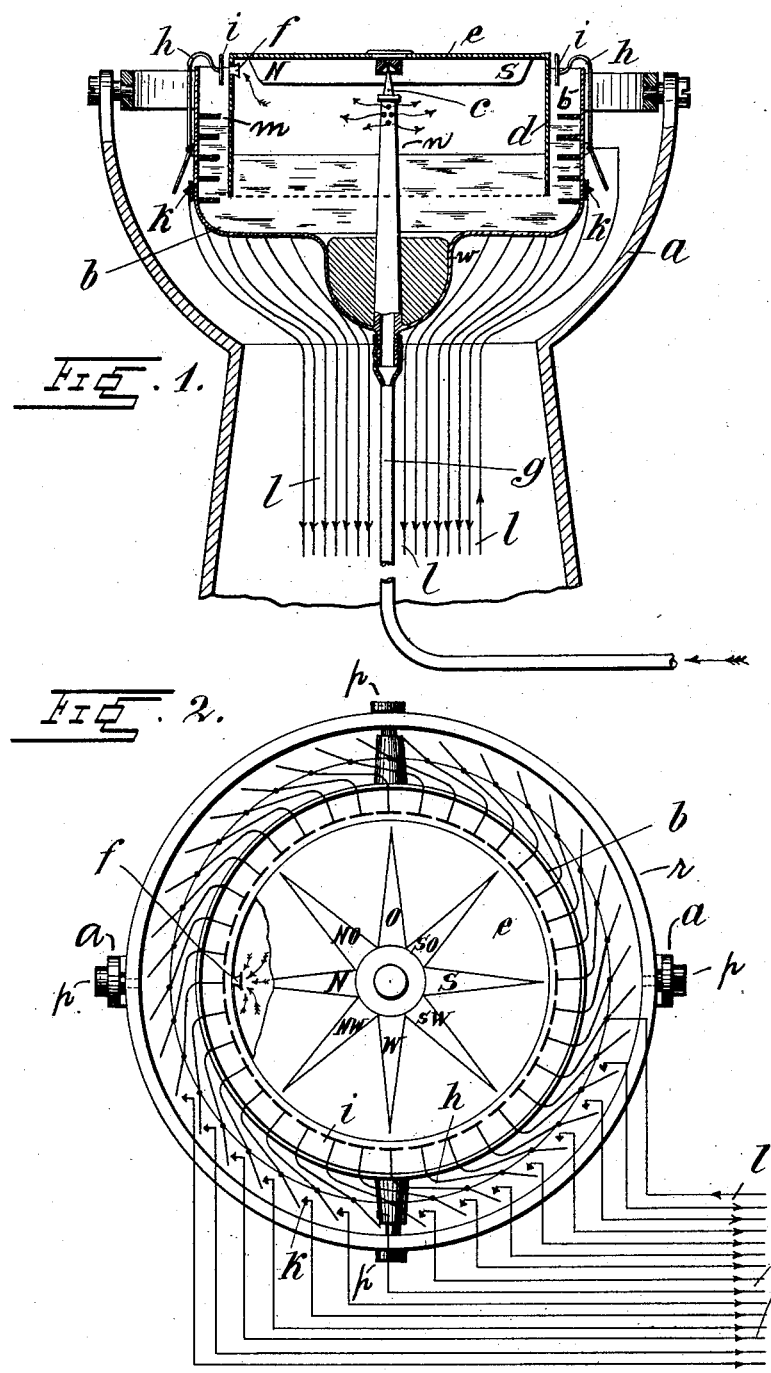

UNITED STATES PATENT OFFICE.

OTTO WIDMANN, OF BERLIN, GERMANY.

APPARATUS FOR TRANSMITTING THE POSITIONS OF MOVABLE POINTERS.

SPECIFICATION forming part of Letters Patent No. 714,081, dated November 18, 1902.

Application filed February 12, 1902. Serial No. 93,757. (No model.)

*To all whom it may concern:*

Be it known that I, OTTO WIDMANN, a subject of the Emperor of Germany, and a resident of Berlin, Germany, have made a new and useful Invention in Apparatus for Copying the Movements of Indicator-Needles, of which the following is a specification.

My invention is directed particularly to improvements in indicating devices in which the movable part thereof is controlled in its movements by a variable source of energy—such, for instance, as a compass-needle; and it has for its objects, first, to provide means for minimizing the friction between the movable part of an indicating instrument and its support; second, to provide means whereby the movements of the movable part thereof may be correctly copied or followed by the movable part of a similar indicator located at a point more or less remote.

My invention has an especial utility in connection with ship-compasses, where it is desired to give an indication at one or more points distant from that where the compass is located of the movements of the compass-needle, and will be fully understood by referring to the accompanying drawings, in which—

Figure 1 is a sectional view taken through the top of a ship's binnacle, illustrating my improvement as applied thereto; and Fig. 2 is a plan view thereof as seen looking at Fig. 1 from the top toward the bottom of the drawings, the electrical conductors and their circuit connections being illustrated diagrammatically in both views.

Referring now to the drawings in detail, $a$ represents a ship's binnacle, to which is secured by the usual gimbal-ring $r$ and pivots $p$ $p$ $p$ $p$ a cylindrical vessel $b$, having in a lower compartment a weight $w$ for maintaining the movable parts always approximately in the same plane.

$n$ represents a hollow or tubular standard secured to the bottom of the vessel $b$ and in the axial line thereof, its upper end being provided with outlets or holes, as shown, and a jewel point or bearing $c$, adapted to sustain in a jewel-bearing a hollow cylindrical bell $d$, made of light material, as aluminium, and having marked upon its upper surface the points of the compass, as indicated clearly in Fig. 2.

$f$ is a nozzle in the upper part of the bell $d$, and NS represents the compass-needle secured to the inner surface of said bell, the nozzle $f$ having a definite or fixed relation thereto, as indicated in Fig. 2.

$m$ $m$ represent five horizontally-disposed flanges or rings secured to the interior surface of the vessel $b$ and adapted to offer more or less resistance to the outflow of a liquid, such as water, with which the vessel $b$ is partially filled.

$h$ $h$ $h$ are curved contact-levers pivotally secured around the outer surface of the vessel $b$ and carrying at their upper ends metal or other plates $i$ of sufficient weight to normally hold the lower ends of the pivoted levers out of contact with electrical contacts $k$ $k$ $k$, insulated from the vessel and connected each with one of a series of flexible conductors $l$ $l$ $l$, running to a point more or less remote, where there is located a receiving instrument (not shown) of any preferred type provided with an indicating-needle or movable part operatively connected with electromagnetic or equivalent electrically-controlled means of any preferred form for causing said needle to follow the movement of the needle NS.

$g$ is a flexible tube secured to the lower end of the hollow standard $n$, its outer end being connected with means (not shown) for constantly forcing air, gas, or any other comparatively frictionless agent into the bell $d$ above the surface of the water. The flexibility of the conductors $l$ and tube $g$ within the binnacle $a$ should be such as not to interfere with the free movement of the vessel $b$ upon its gimbal-supports.

The operation is as follows: Normally all of the contact-levers $h$ $h$ are in the position shown in Fig. 1, with their lower or free ends out of contact with the electrical contacts $k$ $k$ $k$ and their upper ends out of mechanical contact with the freely-moving bell $d$, which is supported by a centrally-located jewel bearing upon the jewel-point $c$. Air under pressure is forced into the flexible tube $g$ in the direction of the arrow, causing the liquid in the bell $d$ to be depressed and to rise in a corresponding manner in the vessel $b$, the flanges m, however, offering sufficient resistance to prevent any undue overflow. This pressure also materially lightens the weight of the bell upon the jewel-bearing c. Air, therefore, flows in the direction of the arrows into the bell and out through the nozzle f. Consequently as the needle NS takes different positions the nozzle f is carried in front of successive plates i, and sufficient pressure is given thereto to cause their corresponding levers h to close the circuit through the corresponding conductors l, running to the receiving instrument. All advance or retrograde movements of the needle will therefore be correctly copied at the receiving-station, owing to the fact that corresponding electrical conditions are transmitted over the interconnected conductors l. The movable indicating-needle, therefore, at the receiving-station will correctly copy the movements of the needle NS at the transmitting-station.

I do not limit my invention to the especial details of construction illustrated in the accompanying drawings, as I believe it is broadly new with me to diminish the weight of the movable part of a ship's compass or any equivalent movable indicating instrument by injecting air beneath said part in such manner as to diminish the friction, and my claims are generic as to this feature.

I believe it is also broadly new with me to copy the movements of the movable part of an indicating instrument at a point more or less remote from said instrument by the combined action of the movable part, of a movable agent, as air, and of a transmitting agent, as electricity, and my claims are generic as to this feature.

Having thus described my invention, what I claim, and desire to secure by Letters Patent of the United States, is—

1. An indicating instrument having a movable part so supported as to rotate freely in a substantially horizontal plane; in combination with means for injecting a comparatively frictionless agent, as air, beneath said movable part so as to tend to lift it off of its support; an air-conveying nozzle carried by the part and adapted to move therewith; movable electrical circuit connections surrounding said part and located in the path of the free end of said nozzle; together with a series of electrical conductors connected to said circuit connections and running to a point more or less remote therefrom, substantially as described.

2. An indicating instrument having a movable part supported by a bell; a pivot-point which supports the bell; means for injecting a comparatively frictionless agent, as air, beneath the bell in such manner as to diminish the friction between the pivot-point and the pivot-bearing of the bell; in combination with an air-conveying nozzle carried by the bell and movable electrical circuit connections surrounding said bell; together with a series of electrical conductors connected thereto and running to a point more or less remote, substantially as described.

3. An indicating instrument having a movable part adapted to move radially about a supporting-point; in combination with means for injecting a comparatively frictionless agent, as air, beneath said part so as to tend to lift it off its support; together with a series of electrical conductors and circuit-controlling contacts controlled by the movements of the frictionless agent, substantially as described.

4. An indicating instrument having a movable part supported by a hollow bell and adapted to rotate upon an axial bearing or pivot point; in combination with a series of electrical conductors running to a point more or less remote; a corresponding series of circuit-closing contacts operatively connected with means located in the path of an opening in the before-mentioned bell, substantially as described.

In witness whereof I have hereunto set my hand in presence of two witnesses.

OTTO WIDMANN.

Witnesses:
WOLDEMAR HAUPT,
HENRY HASPER.